US005623525A

United States Patent [19]
Jensen

[11] Patent Number: 5,623,525
[45] Date of Patent: Apr. 22, 1997

[54] TOOL FOR LIFTING TIE ROD DURING SHROUD REPAIR

[75] Inventor: Grant C. Jensen, Morgan Hill, Calif.

[73] Assignee: General Electric Company, San Jose, Calif.

[21] Appl. No.: 532,190

[22] Filed: Sep. 22, 1995

[51] Int. Cl.⁶ .................................................. G21C 19/20
[52] U.S. Cl. ........................... 376/260; 92/15; 292/144; 294/90; 403/324
[58] Field of Search ..................................... 376/260, 463, 376/233, 261–268; 294/86.33, 90; 403/321, 322, 324, 325; 292/144; 254/29 A; 92/15

[56] References Cited

U.S. PATENT DOCUMENTS 3,795,420  3/1974  Preston, Jr. .......................... 376/264
4,283,158  8/1981  Takahata ............................. 403/322
5,193,431  3/1993  Propsting et al. ..................... 92/21 R Primary Examiner—Daniel D. Wasil
Attorney, Agent, or Firm—James E. McGinness

[57] ABSTRACT

A tool for lifting a tie rod off of the refueling floor and lowering the tie rod into the downcomer annulus of a boiling water reactor during a shroud repair operation. The tie rod lifting tool can be attached to the end of a strongback suspended from a hoisting cable or to the end of the cable itself. One embodiment of the tie rod lifting tool has redundant locking pins which interlock with corresponding holes formed in the end of the tie rod. The locking pins are moved out of locking engagement in response to actuation of respective pneumatic cylinders. The locking pins are latched so that the tie rod cannot be disengaged from the lifting tool unless the latches are first manually released by an operator using a handling pole.

16 Claims, 4 Drawing Sheets

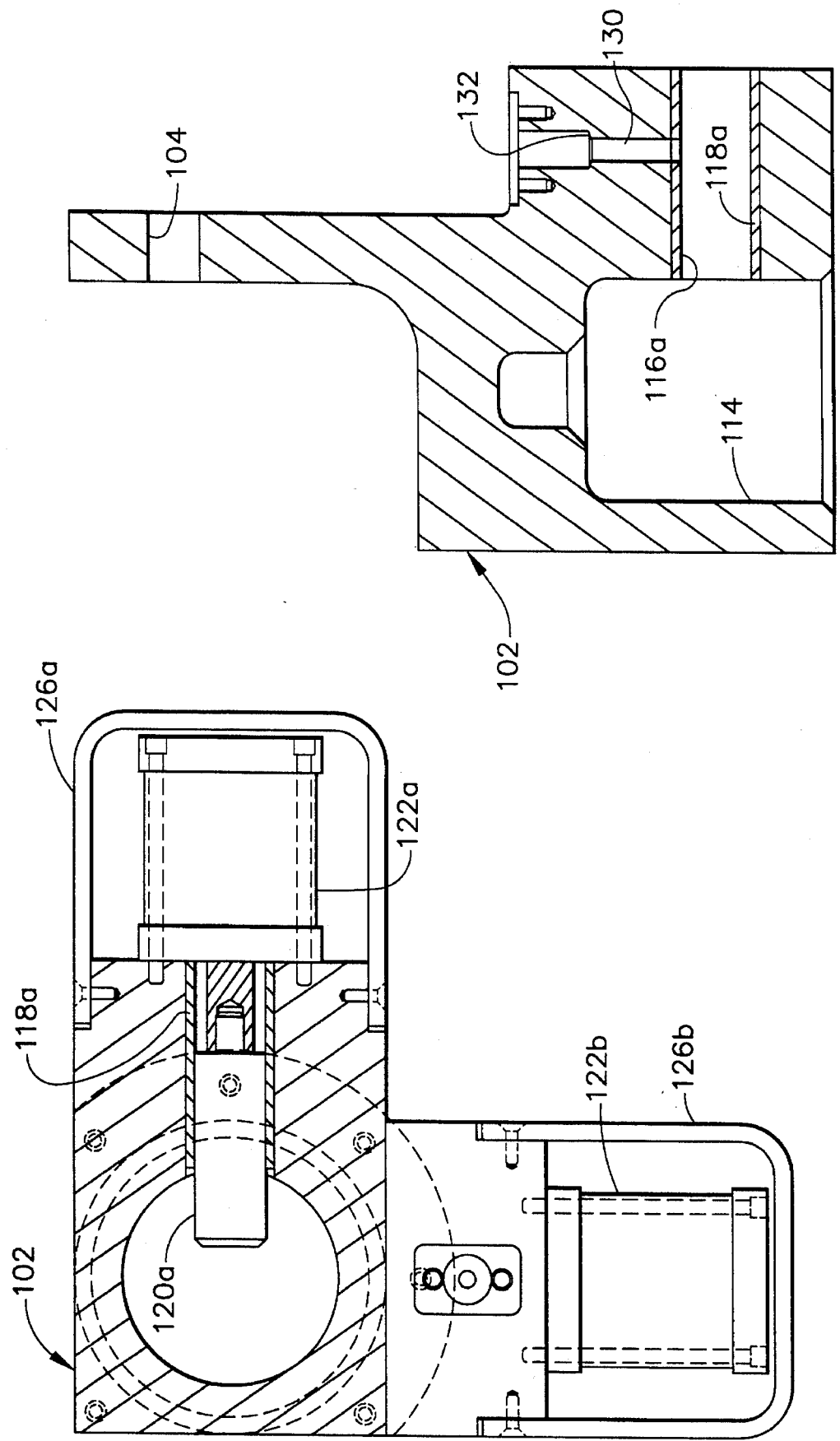

TOOL FOR LIFTING TIE ROD DURING SHROUD REPAIR

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

As seen in FIG. 1, a conventional boiling water reactor has a reactor pressure vessel 10 and a core shroud 12 arranged concentrically in the RPV with an annular region 8, commonly referred to as the "downcomer annulus", therebetween. The core shroud 12 is a stainless steel cylinder surrounding the nuclear fuel core comprising a plurality of fuel bundle assemblies (not shown). Each array of fuel bundle assemblies is supported at the top by a top guide and at the bottom by a core plate. During operation of the reactor, water is continuously recirculated down the downcomer annulus 8 and then up through the core. This flow is induced by a multiplicity of jet pumps located in the downcomer annulus and driven by recirculation pumps (not shown) outside the reactor pressure vessel.

The core shroud 12 comprises a shroud head flange 12a for supporting the shroud head 28; a circular cylindrical upper shroud wall 12b having a top end welded to shroud head flange 12a; an annular top guide support ring 12c welded to the bottom end of upper shroud wall 12b; a circular cylindrical middle shroud wall comprising three sections 12d, 12e and 12f welded in series, with a top end of section 12d being welded to top guide support ring 12c; and an annular core plate support ring 12g welded to the bottom end of middle shroud wall section 12f and to the top end of a lower shroud wall 12h. The entire shroud is supported by a shroud support 14, which is welded to the bottom of lower shroud wall 12h, and by annular shroud support plate 16, which is welded at its inner diameter to shroud support 14 and at its outer diameter to RPV 10.

In the event of a seismic disturbance, it is conceivable that the ground motion will be translated into lateral deflection relative to the reactor pressure vessel of those portions of the shroud located at elevations above shroud support plate 16. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 12, which vertically and horizontally supports the core top guide and the shroud head 22. In particular, a cracked shroud increases the risks posed by a loss-of-coolant accident (LOCA). During a LOCA, the loss of coolant from the reactor pressure vessel produces a loss of pressure above the shroud head 22 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A known repair method for vertically restraining a weakened core shroud utilizes tensioned tie rods coupled to the shroud flange 12a and to the shroud support plate 16, as seen in FIG. 1. In addition, the shroud is restrained laterally by installation of wishbone springs which, along with the tie rod, are components of the shroud repair assembly. During repair of the shroud, a tie rod must be lifted from a horizontal position on the refueling floor to a vertical position suspended from a hoisting cable. The hoist is then transported to the azimuthal position whereat the shroud repair assembly is to be installed and then lowered into the downcomer annulus. Once the lower end of the tie rod has been vertically supported, the hoisting cable is disengaged from the upper end of the tie rod. The upper end of the tie rod is then ready to be anchored on the shroud flange. While the tie rod is suspended from the cable, it is critical that the tie rod, which weighs more than 1,000 pounds, not be dropped into the annulus. Such an accident could cause damage to the jet pump assemblies in the downcomer annulus. Also the operation to retrieve the dropped tie rod lengthens the duration of the shroud repair operation and, consequently, increases reactor downtime.

SUMMARY OF THE INVENTION

The present invention is a tool for lifting a tie rod off of the refueling floor and into the downcomer annulus of a boiling water reactor during a shroud repair operation. The tie rod lifting tool can be attached to the end of a strongback suspended from a hoisting cable or to the end of the cable itself. The tie rod lifting tool in accordance with the invention comprises an adaptor having means for coupling to a tie rod and means for latching the coupling means in the tie rod coupling position. Before the adaptor can be disengaged from the tie rod, the latching means must be released by remote manipulation of a handling pole by an operator standing on the refueling bridge. The requirement of a separate act of unlatching reduces the risk that the tie rod will be disengaged from the hoisting cable unintentionally.

In accordance with the preferred embodiment of the invention, the tie rod lifting tool has redundant locking pins which interlock with corresponding holes formed in the end of the tie rod in response to actuation of respective pneumatic cylinders. The locking pins are latched so that the tie rod cannot be disengaged from the lifting tool unless the latches are first manually released by an operator using a handling pole. Each locking pin is capable of supporting the entire weight of the tie rod.

BRIEF DESCRIPTION OF THE DRAWINGS

FIGS. 3A and 3B are partly sectioned elevation and plan views of a tie rod adaptor in accordance with the preferred embodiment of the invention.

FIG. 4 is an elevation view of the latch assembly incorporated in the tie rod adaptor depicted in FIGS. 3A and 3B.

DETAILED DESCRIPTION OF THE PREFERRED EMBODIMENT

Figure 1:
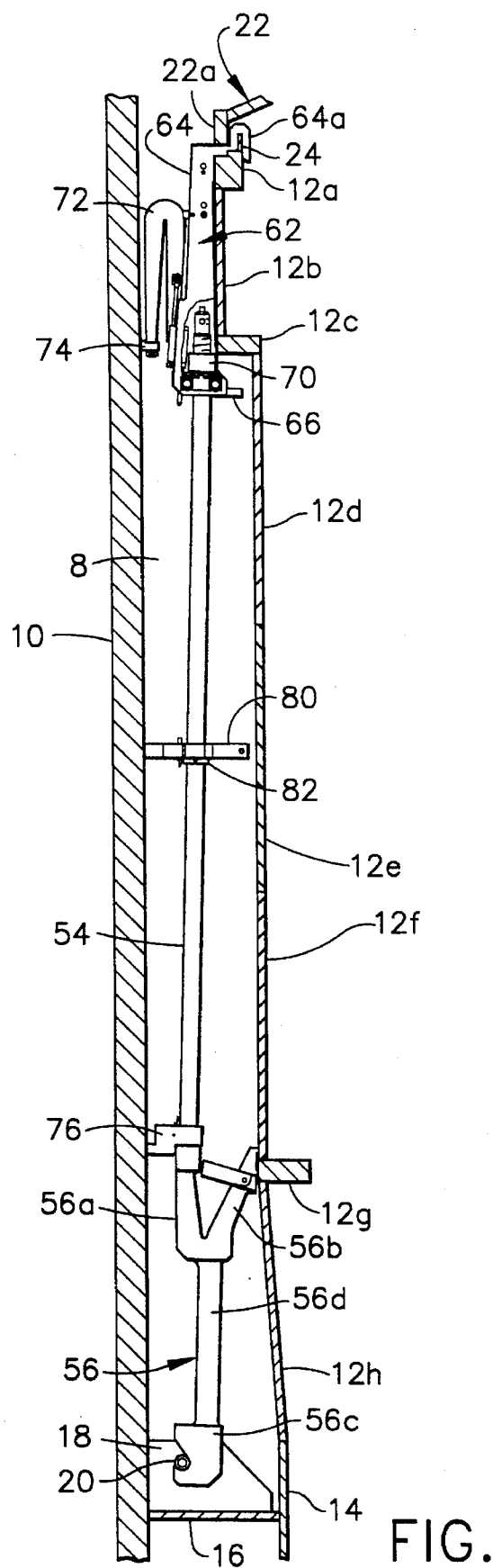
FIG. 1 is an elevational view of core shroud repair apparatus comprising a tie rod assembly for vertically restraining the shroud and wishbone springs for laterally restraining the shroud at the elevations of the top guide support ring and the core plate.

Referring to FIG. 1, a shroud restraint tie rod assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 12c. The upper end of tie rod 54 has a threaded portion.

The lower spring 56 is anchored to a gusset plate 18 attached to the shroud support plate 16. The lower spring 56 has a slotted end which straddles gusset plate 18 and forms a clevis hook 56c. The clevis hooks under opposite ends of a clevis pin 20 inserted through a hole machined in the gusset plate 18. Engagement of the slotted end with the gusset plate 18 maintains alignment of lower spring 56 under the action of seismic motion of the shroud, which may be oblique to the spring's radial orientation.

The tie rod 54 is supported at its top end by an upper support assembly which hangs on the shroud flange. A pair of notches or slots are machined in the shroud head ring 22a of shroud head 22. The notches are positioned in alignment with a pair of bolted upper support plate segments 62 of the upper support assembly when the shroud head 22 is properly seated on the top surface of shroud flange 12a. These notches facilitate the coupling of the tie rod assembly to the shroud flange.

The pair of notches at each tie rod azimuthal position receive respective hook portions 64a of the upper support plates 64. Each hook 64a conforms to the shape of the top surface of shroud flange 12a and the shape of the steam dam 24. The distal end of hook 64a hooks on the inner circumference of steam dam 24.

The upper support plates 64 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded nut 70 is torqued onto the upper threaded portion of the tie rod 54.

As seen in FIG. 1, the assembly comprised of support plates 64 with hooks 64a, support block 66, tie rod 54, lower spring 56, clevis pin 20 and gusset plate 18 form a vertical load path by which the shroud flange 12a is connected to the shroud support plate 16. In the tensioned state, the upper support plates 64 exert a restraining force on the top surface of shroud flange 12a which opposes separation of the shroud 12 at any assumed failed circumferential weld location.

Figure 2:
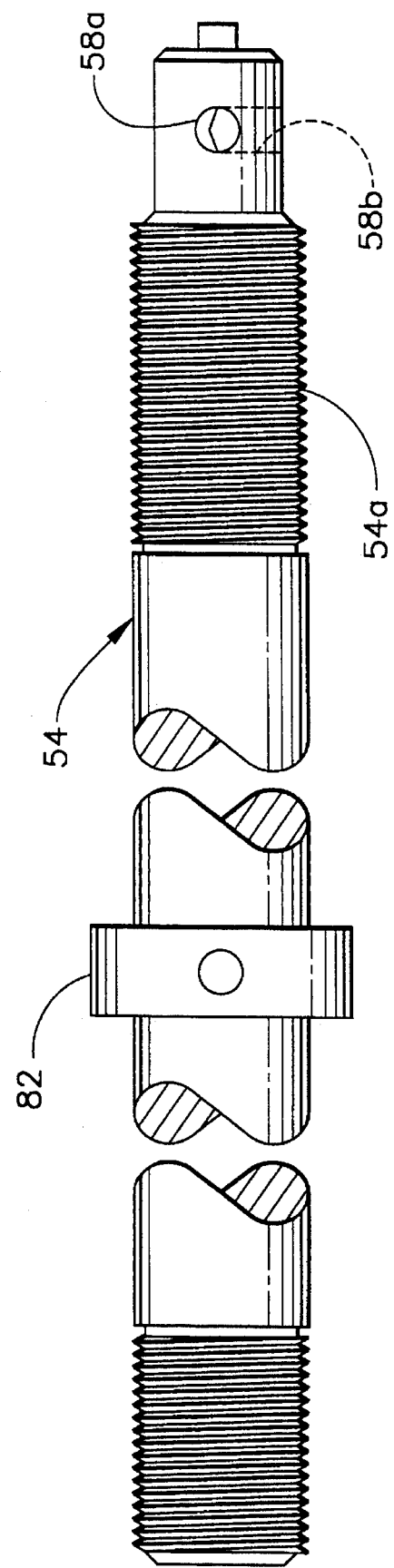
FIG. 2 is an elevation view of the upper end of the tie rod incorporated in the shroud repair assembly shown in FIG. 1.

Lateral restraint at the elevation of the top guide support ring 12c is provided by an upper spring 72 having a double cantilever "wishbone" design. Upper spring 72 is installed after installation of the upper support assembly and tensioning of nut 70. The spring arm 56a of lower spring 56 laterally supports the shroud 12 at the core plate support ring 12g, against the vessel 10. The top end of spring arm 56a has a threaded bore to provide the attachment for the bottom of the tie rod 54. The member 56d connecting the upper wishbone spring 56a, 56b to the clevis hook 56c is offset from the line of action between the lower end of tie rod 54 and the clevis pin 20 to provide a vertical spring compliance in the load path to the tie rod. A middle support 80 is preloaded against the vessel wall at assembly by radial interference which bends the tie rod 54, thereby providing improved resistance to vibratory excitation failure of the tie rod. To facilitate mounting of the middle support 80, a mid-support ring 82 is secured to the tie rod 54, as shown in FIG. 2. The middle support 80 has a section of an annular recess counterbored in its bottom which form fits on ring 82, thereby preventing lateral shifting of middle support 80 relative to tie rod 54.

During the installation procedure, the tie rod/lower spring assembly is lowered into the downcomer annulus. This is accomplished using a crane on the refueling floor of the reactor. First, the tie rod assembly must be raised from horizontal position on the refueling floor to a vertical position suspended from the end of the crane cable. This is accomplished by means of an adaptor which couples the upper end of the tie rod to the end of the cable. When the cable is wound, the upper end of the tie rod is lifted off the refueling floor into an upright position with all of the weight of the tie rod being supported by the cable. The tie rod assembly can then be lowered into the annulus by unwinding the cable. If vertical access to the down-comer annulus is limited by internal reactor structures, such as the feedwater sparger and core spray piping, the adaptor can be coupled to the end of the hoist cable via a rigid frame or strongback specially designed to bypass the obstruction. Maneuvering of the tie rod/lower spring assembly must be done with extreme care to avoid damaging reactor hardware such as the jet pump sensing lines.

Figure 3A:
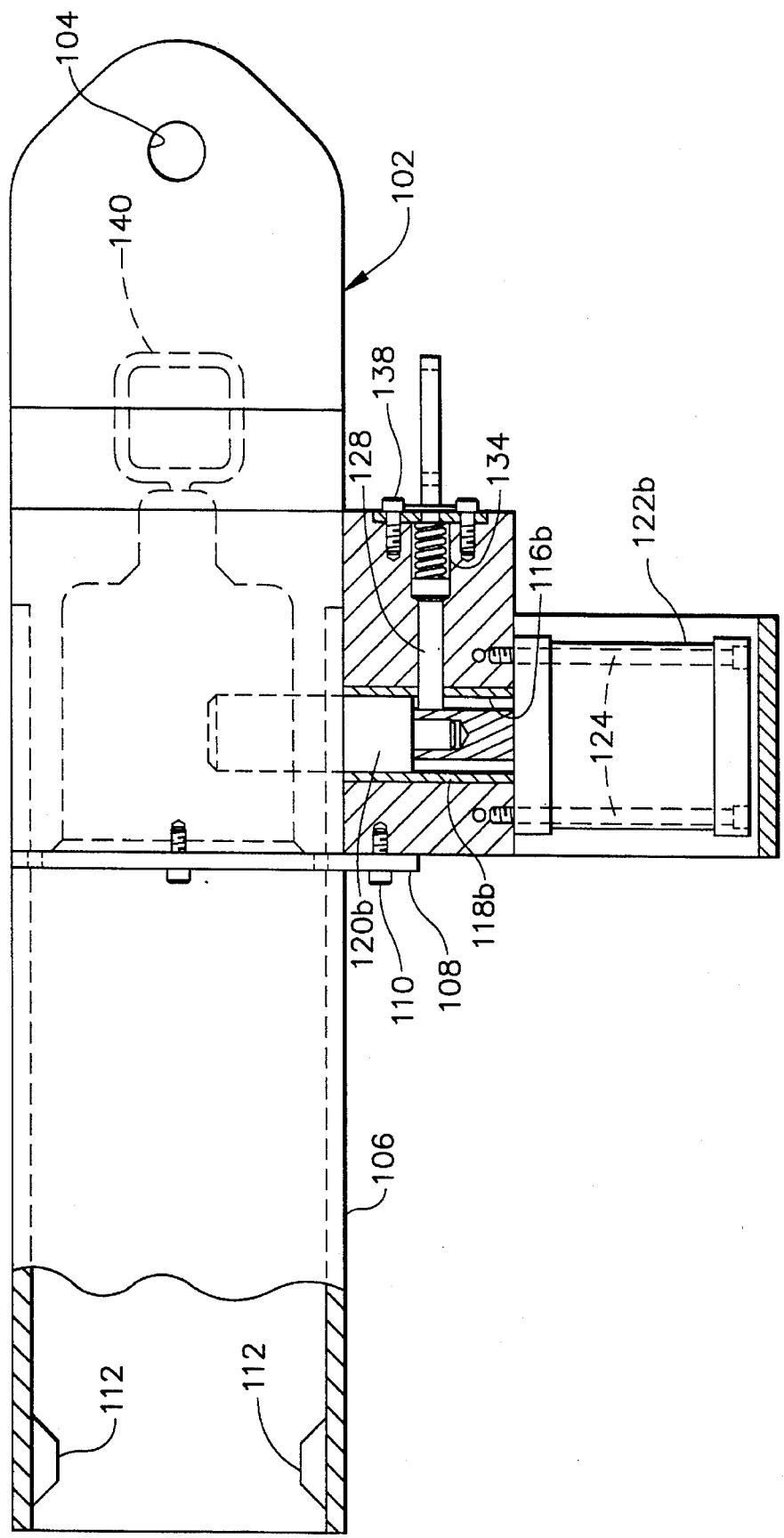

Referring to FIGS. 3A and 3B, the tie rod adaptor in accordance with the preferred embodiment of the invention comprises a frame 102 having a hole 104 for receiving a conventional coupling mechanism, such as a clevis pin (not shown), which must be strong enough to bear the entire weight of the tie rod assembly. A circular cylindrical shield 106 for protecting the threads of the tie rod is connected to the frame 102 by means of a mounting plate 108 attached to the frame by a plurality of screws 110. The shield 106 has a plurality (e.g., six) of radially inwardly directed projections 112 (shown hidden in FIG. 3A) circumferentially distributed at equiangular intervals (e.g., 60°) at the bottom of its internal surface. These projections maintain a predetermined annular gap between the tie rod and the shield.

As best seen in FIG. 4, frame 102 has an axial recess 114 shaped for receiving the upper end of the tie rod. The frame 102 further has a pair of circular cylindrical holes 116a and 116b which communicate with axial recess 114. Each hole 116a and 116b has a respective bushing 118a and 118b in which a respective locking pin 120a and 120b is slidably mounted. Each locking pin is slidable from a first position whereat the locking pin does not interfere with axial recess 114 to a second position whereat the locking pin interferes with axial recess 114, as seen in FIG. 3B. Each locking pin 120a and 120b is disposed radially relative to the axis of the tie rod and is configured to fit with little play inside a respective one of circular cylindrical radial holes 58a and 58b formed in the topmost portion of the tie rod upper end, as shown in FIG. 2, and inside a respective one of the bushings 118a and 118b. The front end of each locking pin is chamfered to facilitate entry of the locking into the radial holes 58a and 58b. In the preferred embodiment, the holes 58a and 58b are mutually perpendicular, as are the locking pins 120a and 120b. Each locking pin is capable of supporting the entire weight of the tie rod, which is in excess of 1,000 pounds.

Each locking pin 120a and 120b slides from the interfering position to the non-interfering position in response to actuation of a respective pneumatic cylinder 122a and 122b. The piston of pneumatic cylinder 122a is connected to a reduced-diameter end of locking pin 120a; the piston of pneumatic cylinder 122b is connected to a reduced-diameter end of locking pin 120b. Each pneumatic cylinder is attached to the frame 102 by socket head screws 124, as seen in FIG. 3A. As best seen in FIG. 3B, each cylinder is protected against damage by a respective U-shaped cylinder shield 126a and 126b attached to frame 102 via screws.

Each pneumatic cylinder is connected to a separate source of pressurized fluid via a respective pneumatic line (not shown). Each piston is retracted when pressurized fluid, e.g., air, is supplied to the cylinder and extended by a spring return when the supply of pressurized fluid is cut off. When the pistons are extended, they interlock the adaptor to the tie rod via locking pins 120a and 120b which extend into tie rod holes 58a and 58b (see FIG. 4) respectively. Each cylinder has a spring return (not shown) which urges the locking pins to engage tie rod holes 58a and 58b when pneumatic pressure is discontinued. The provision of redundant locking pins has the advantage that the adaptor remains coupled to the tie rod even in the event of accidental retraction of one piston.

As a further safeguard to prevent dropping the tie rod into the annulus, the locking pins are latched so that the tie rod cannot be disengaged from the lifting tool until the locking pins have been manually unlatched by an operator using a handling pole. As seen in FIG. 3A, the locking pin 120a has a radius greater than the radius of the piston of cylinder 122a. When the tip of a latch 128 is inserted behind the shoulder of locking pin 120a, the locking pin is latched in its interfering position and cannot be removed unless latch 128 has been removed. An identical latch performs the same function for locking pin 120b.

Figure 5:
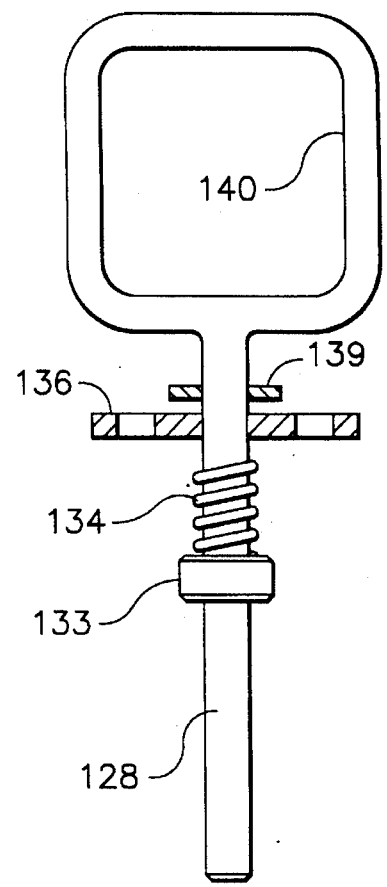
FIG. 5 is a partly sectioned view of the latch assembly incorporated in the tie rod adaptor depicted in FIGS. 3A and 3B.

Latch 128 is installed in an unthreaded hole 130 which communicates with the hole 116a, as best seen in FIG. 4. Hole 130 has two coaxial sections of different diameter which form an offset 132. A stop ring 132 slides in the larger-diameter section of hole 130 and is urged against the offset 132 by a compression spring 134. The compression spring is inserted with one end bearing against the stop ring 132 and the other end bearing against a cover plate 136, which is attached to the frame 102 by means of screws 138. The shaft of latch 128 extends through a hole in cover plate 136 and through a washer 138. The exposed end of the latch shaft is integrally joined with an eyebolt 140. The structure of the latch assembly is shown in detail in FIG. 5.

By coupling a pole-mounted hook or other tool to the eyebolt 140, an operator standing on the refueling bridge can pull out the latch 128 to free the locking pin 120a and allow it to retract to the noninterfering position. When both locking pins are retracted, the tie rod lifting tool can be disengaged from the tie rod and removed from the annulus.

The preferred embodiment of the tie rod lifting tool in accordance with the present invention have been disclosed for the purpose of illustration. Variations and modifications of the disclosed structure which fall within the concept of this invention will be readily apparent to persons skilled in the art of tooling design. All such variations and modifications are intended to be encompassed by the claims set forth hereinafter.

I claim:

1. A tool for lifting a tie rod, comprising:

a frame having an axial recess shaped to receive an uppermost portion of a tie rod, a first hole for receiving a locking pin, and a second hole for receiving a latch, said second hole communicating with said first hole, said frame further comprising a coupling mechanism;

a first locking pin slidably mounted in said first hole in said frame, said first locking pin being slidable between a locking position whereat said first locking pin penetrates said axial recess and engages the tie rod and an unlocking position whereat said first locking pin does not penetrate said axial recess and does not engage the tie rod;

a first fluid-actuated cylinder attached to said frame, said first locking pin having one end connected to a piston of said first fluid-actuated cylinder, said piston being retracted in response to the supply of pressurized fluid into said first fluid-actuated cylinder, said first fluid-actuated cylinder having a spring return which extends said piston in the absence of pressurized fluid into said first fluid-actuated cylinder, said first locking pin being slided from said locking position to said unlocking position when said piston is retracted; and a first latch slidably mounted in said second hole in said frame, said first latch being slidable between a latching position whereat said first latch blocks sliding of said first locking pin and an unlatching position whereat said first latch does not block sliding of said first locking pin, wherein when pressurized fluid is supplied to said cylinder for retracting said piston, said first latch in said latching position prevents retraction of said piston.

2. The tool as defined in claim 1, wherein said frame has a third hole for receiving a locking pin and a fourth hole for receiving a latch, said third hole communicating with said fourth hole, further comprising:

a second locking pin slidably mounted in said third hole in said frame, said second locking pin being slidable between a locking position whereat said second locking pin penetrates said axial recess and engages the tie rod and an unlocking position whereat said second locking pin does not penetrate said axial recess and does not engage the tie rod; and a second latch slidably mounted in said fourth hole in said frame, said second latch being slidable between a latching position whereat said second latch blocks sliding of said second locking pin and an unlatching position whereat said second latch does not block sliding of said second locking pin.

3. The tool as defined in claim 2, wherein each of said first and second locking pins is designed to individually support the full weight of the tie rod.

4. A tool for lifting a tie rod, comprising:

a frame having an axial recess shaped to receive an uppermost portion of a tie rod, a first hole for receiving a locking pin, and a second hole for receiving a latch, said second hole communicating with said first hole, said frame further comprising a coupling mechanism;

a first locking pin slidably mounted in said first hole in said frame, said first locking pin being slidable between a locking position whereat said first locking pin penetrates said axial recess and engages the tie rod and an unlocking position whereat said first locking pin does not penetrate said axial recess and does not engage the tie rod; and a first latch slidably mounted in said second hole in said frame, said first latch being slidable between a latching position whereat said first latch blocks sliding of said first locking pin and an unlatching position whereat said first latch does not block sliding of said first locking pin, wherein said first latch is connected to an eyebolt projecting external to said frame.

5. The tool as defined in claim 1, further comprising a cover attached to said frame for protecting said first fluid-actuated cylinder against damage.

6. The tool as defined in claim 2, further comprising a second fluid-actuated cylinder attached to said frame, wherein said second locking pin has one end connected to a piston of said second fluid-actuated cylinder.

7. The tool as defined in claim 2, wherein said first and third holes are circular cylindrical bores having first and second axes respectively, said first and second axes being non-parallel.

8. The tool as defined in claim 1, wherein said coupling mechanism comprises a third hole for receiving a mechanism for suspending said frame from a cable.

9. A tool for lifting a tie rod, comprising:

a frame having an axial recess shaped to receive an uppermost portion of a tie rod, a first hole for receiving a locking pin, said first hole being disposed transverse to an axis of and communicating with said axial recess, a second hole for receiving a latch, said second hole communicating with said first hole, and a third hole for receiving a mechanism for suspending said frame from a cable;

a first locking pin slidably mounted in said first hole in said frame, said first locking pin being slidable between a locking position whereat said first locking pin penetrates said axial recess and engages the tie rod and an unlocking position whereat said first locking pin does not penetrate said axial recess and does not engage the tie rod;

a first fluid-actuated cylinder attached to said frame, said first locking pin having one end connected to a piston of said first fluid-actuated cylinder said piston being retracted in response to the supply of pressurized fluid into said first fluid-actuated cylinder, said first fluid-actuated cylinder having a spring return which extends said piston in the absence of pressurized fluid into said first fluid-actuated cylinder, said first locking pin being slid from said locking position to said unlocking position when said piston is retracted; and a first latch slidably mounted in said second hole in said frame, said first latch being slidable between a latching position whereat said first latch blocks sliding of said first locking pin in an unlocking direction from said locking position to said unlocking position and an unlatching position whereat said first latch does not block sliding of said first locking pin in said unlocking direction wherein when pressurized fluid is supplied to said cylinder for retracting said piston, said first latch in said latching position prevents retraction of said piston.

10. The tool as defined in claim 9, wherein said frame has a fourth hole for receiving a locking pin and a fifth hole for receiving a latch, said fourth hole communicating with said fifth hole, further comprising:

a second locking pin slidably mounted in said fourth hole in said frame, said second locking pin being slidable between a locking position whereat said second locking pin penetrates said axial recess and engages the tie rod and an unlocking position whereat said second locking pin does not penetrate said axial recess and does not engage the tie rod; and a second latch slidably mounted in said fifth hole in said frame, said second latch being slidable between a latching position whereat said second latch blocks sliding of said second locking pin in an unlocking direction from said locking position to said unlocking position and an unlatching position whereat said second latch does not block sliding of said second locking pin in an unlocking direction.

11. The tool as defined in claim 10, wherein each of said first and second locking pins is designed to individually support the full weight of the tie rod.

12. The tool as defined in claim 10, further comprising a second fluid-actuated cylinder attached to said frame, wherein said second locking pin has one end connected to a piston of said second fluid-actuated cylinder.

13. A tool for lifting a tie rod, comprising:

a frame having an axial recess shaped to receive an uppermost portion of a tie rod, a first hole for receiving a locking pin, said first hole being disposed transverse to an axis of and communicating with said axial recess, a second hole for receiving a latch, said second hole communicating with said first hole, and a third hole for receiving a mechanism for suspending said frame from a cable;

a first locking pin slidably mounted in said first hole in said frame, said first locking pin being slidable between a locking position whereat said first locking pin penetrates said axial recess and engages the tie rod and an unlocking position whereat said first locking pin does not penetrate said axial recess and does not engage the tie rod; and a first latch slidably mounted in said second hole in said frame, said first latch being slidable between a latching position whereat said first latch blocks sliding of said first locking pin in an unlocking direction from said locking position to said unlocking position and an unlatching position whereat said first latch does not block sliding of said first locking pin in said unlocking direction, wherein said first latch is connected to an eyebolt projecting external to said frame.

14. The tool as defined in claim 12, further comprising first and second covers attached to said frame for protecting said first and second fluid-actuated cylinders respectively against damage.

15. The tool as defined in claim 10, wherein said first and fourth holes are circular cylindrical bores having first and second axes respectively, said first and second axes being non-parallel.

16. The tool as defined in claim 9, further comprising a bushing arranged in said first hole, said bushing having a circular cylindrical bore in which said first locking pin is slidable.

* * * * *